United States Patent
Meis et al.

(10) Patent No.: US 10,737,793 B2
(45) Date of Patent: Aug. 11, 2020

(54) AIRCRAFT ICE DETECTION SYSTEMS AND METHODS

(71) Applicant: The Boeing Company, Chicago, IL (US)

(72) Inventors: Charles Steven Meis, Renton, WA (US); Anthony D. Drury, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 184 days.

(21) Appl. No.: 14/957,478

(22) Filed: Dec. 2, 2015

(65) Prior Publication Data

US 2017/0158336 A1 Jun. 8, 2017

(51) Int. Cl.
*B64D 15/22* (2006.01)

(52) U.S. Cl.
CPC ................................. *B64D 15/22* (2013.01)

(58) Field of Classification Search
CPC .......... B64D 15/20; B64D 15/22; B64C 5/10; B64C 9/22; B64C 9/24; B64C 3/385
See application file for complete search history.

(56) References Cited

U.S. PATENT DOCUMENTS

| | | | | |
|---|---|---|---|---|
| 2,476,217 A | * | 7/1949 | Pond ...................... | B64D 15/20 244/134 F |
| 3,069,906 A | * | 12/1962 | Eiland, Jr. .............. | B64D 43/02 73/170.02 |
| 3,123,327 A | * | 3/1964 | Padgett, Jr. ........... | B64C 27/006 244/134 D |
| 3,996,787 A | * | 12/1976 | Edgington ............. | B64D 15/20 244/134 F |
| 4,489,591 A | * | 12/1984 | Myrick ................... | G01P 21/00 73/1.78 |
| 4,873,510 A | * | 10/1989 | Khurgin ................. | B64D 15/20 340/580 |
| 5,104,061 A | * | 4/1992 | Doane ...................... | B64C 3/40 244/131 |
| 5,257,536 A | * | 11/1993 | Beigbeder ............. | G01P 13/025 73/170.02 |

(Continued)

OTHER PUBLICATIONS

FAA, Helicopter Flying Handbook, FAA-H-8083-21A (2012), Chapter 2, Aerodynamics of Flight; https://www.faa.gov/regulations_policies/handbooks_manuals/aviation/helicopter_flying_handbook/; accesssed Apr. 2, 2017 (Year: 2012).*

(Continued)

*Primary Examiner* — Nicholas McFall
(74) *Attorney, Agent, or Firm* — Haynes and Boone, LLP

(57) ABSTRACT

Systems and methods are provided for an ice detector with a movable airfoil. The movable airfoil may be airfoil shaped and the ice detector may include an ice detection sensor. The movable airfoil may be adjusted in angle of attack and/or configuration to simulate the pressure gradient experienced by one or more of the wing, fuselage, engine, horizontal/vertical stabilizer, or other component of the aircraft. Sensors may be used to detect the configuration of the aircraft or the components of the aircraft and the configuration of the movable airfoil may then be adjusted to approximate the pressure distribution around the aircraft component. Ice accretion on the movable airfoil may be determined via the data from the ice detector.

20 Claims, 6 Drawing Sheets

(56) References Cited

U.S. PATENT DOCUMENTS

| | | | | | |
|---|---|---|---|---|---|
| 5,595,357 | A * | 1/1997 | Catlin | .................... | B64D 43/02 244/1 R |
| 5,748,091 | A * | 5/1998 | Kim | ..................... | G08B 19/02 244/134 F |
| 6,140,942 | A * | 10/2000 | Bragg | .................... | B64C 13/00 340/601 |
| 6,430,996 | B1 * | 8/2002 | Anderson | .............. | B64D 15/20 73/170.26 |
| RE39,295 | E | 9/2006 | Cronin et al. | | |
| 7,104,502 | B2 * | 9/2006 | Otto | ..................... | B64D 15/20 244/134 F |
| 7,155,968 | B2 * | 1/2007 | Collot | ................... | B64D 43/02 73/170.02 |
| 7,155,969 | B2 * | 1/2007 | Drutowski | ............. | G01P 5/245 73/170.02 |
| 7,439,877 | B1 * | 10/2008 | Jarvinen | ................ | B64D 15/20 340/581 |
| 8,265,805 | B2 * | 9/2012 | Ma | ......................... | B64D 15/20 340/963 |
| 2004/0024538 | A1 * | 2/2004 | Severson | .............. | B64D 15/22 702/24 |
| 2004/0155151 | A1 * | 8/2004 | Szilder | .................. | B64D 15/20 244/134 F |
| 2004/0231410 | A1 * | 11/2004 | Bernard | ................. | B64D 15/20 73/170.26 |
| 2004/0261518 | A1 * | 12/2004 | Seidel | .................... | B64D 43/02 73/182 |
| 2008/0128556 | A1 * | 6/2008 | Platt | ....................... | B64D 15/20 244/134 F |
| 2011/0184591 | A1 * | 7/2011 | Kordt | ................... | G05D 1/0825 701/3 |
| 2012/0298801 | A1 * | 11/2012 | Ellison | .................. | B64D 43/02 244/129.1 |
| 2014/0184789 | A1 * | 7/2014 | Meis | ..................... | B64D 15/20 348/135 |
| 2014/0257771 | A1 * | 9/2014 | Lu | .......................... | B64D 15/20 703/2 |
| 2016/0039527 | A1 * | 2/2016 | Goto | ..................... | B61D 49/00 248/214 |
| 2018/0155054 | A1 * | 6/2018 | Ouellette | .................. | B64C 3/44 |

OTHER PUBLICATIONS

Lorraine De Baudus and Phillippe Castaigns, "Control your speed . . . during climb", Safety First (The Airbus Safety Magazine), # 20, Jul. 2015, pp. 006-013 (Year: 2015).*

* cited by examiner

AIRCRAFT ICE DETECTION SYSTEMS AND METHODS

TECHNICAL FIELD

The disclosure relates generally to aircraft ice detection and more particularly to eliminating a zone of non-detection within aircraft ice detection equipment.

BACKGROUND

Accumulation of ice on aircraft surfaces is a threat to aircraft safety. Even a small amount of ice accumulation on, for example, a leading edge of a surface of an aircraft aerodynamic device (e.g., a wing) can have significant impacts on the lift and drag characteristics of the aircraft. Accordingly, aircraft will often contain anti-icing and/or deicing systems that are used to prevent or combat the formation of ice. While conventional ice detection systems are designed to accumulate, detect, and alert the pilot and/or crew to ice accretion at essentially the same time that wings, engine inlets, and/or other leading edge surfaces accumulate ice, there may be conditions where the leading edge surfaces may accrete ice, but the detection systems do not under the same conditions, leading to undetected ice formation. Accordingly, there is a need for improvements in ice detection systems to fully cover all situations where ice may accrete on leading edge surfaces.

SUMMARY

Systems and methods are disclosed herein for aircraft ice detection systems and methods. In a certain embodiment, an apparatus for an aircraft may be provided. The apparatus may include an ice detector including a movable airfoil disposed on the aircraft. At least an angle of attack of the movable airfoil may be adjustable and the movable airfoil may substantially simulate airflow over at least a portion of a surface of an aircraft during operation of the aircraft by, at least in part, a shape of the movable airfoil and adjusting the angle of attack of at least a portion of the movable airfoil.

In another embodiment, a method of using the apparatus may be provided. The method may include determining a configuration of at least a portion of the surface of the aircraft, adjusting, responsive to the configuration of the surface, the angle of attack of the movable airfoil of the aircraft, and determining ice accretion on the movable airfoil.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Accumulation of ice on aircraft surfaces is a threat to aircraft safety as even a small amount of ice accumulation on an aircraft control or flow surface can have a significant impact on the lift and drag characteristics of the aircraft. An aircraft control surface may be any surface that may contribute to a dynamic characteristic of the aircraft. The control surface may be, for example, a surface of a wing, a tail, a surface of a stabilizer, a surface of an engine, portions of a fuselage used to control the movement of the aircraft, and other control surfaces.

Aircraft will often contain anti-icing and/or deicing systems that are used to prevent or combat the formation of ice. Ice detectors may be installed to detect the formation of ice and, upon detection of ice, an anti-icing/deicing system may be activated to remove or prevent the formation of ice on the control surfaces. However, conventional ice detectors may not accurately simulate the pressure distribution of an aircraft control or flow surface. As the ice detectors may have a pressure distribution different from the aircraft control surface, such conventional ice detectors may exhibit a Zone of Non-Detection (ZND) where, due to the difference in the pressure distributions of the control or flow surface and the ice detector, ice may be able to form on the control or flow surface, but not on the ice detector. Thus, the ice detector is then unable to detect the formation of ice on the control or flow surface. The ZND may lead to dangerous conditions during the operation of the aircraft. Such conditions may be further discussed in FIG. 2.

Figure 1:
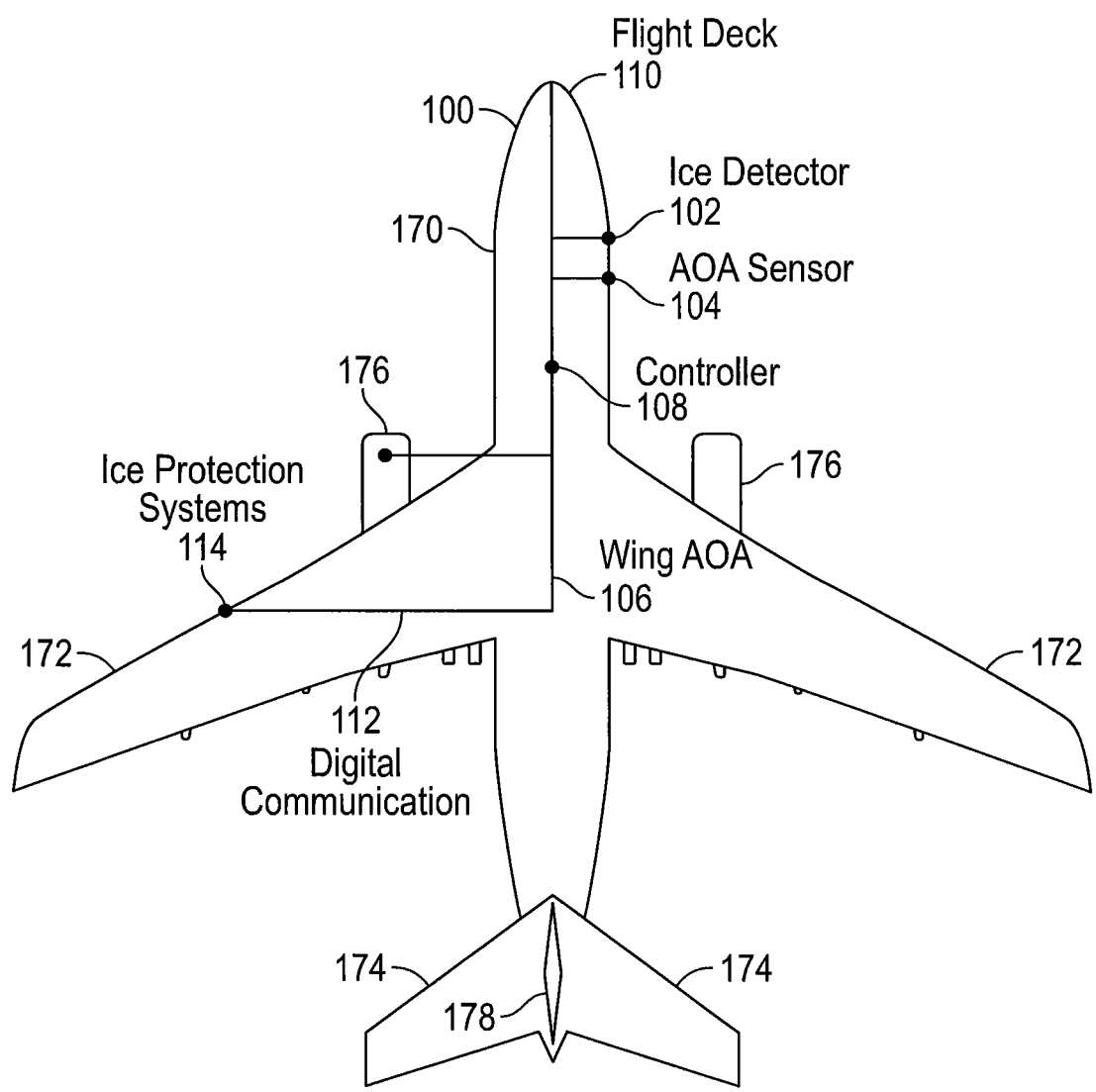
FIG. 1 illustrates an example aircraft in accordance with the disclosure.

FIG. 1 illustrates an example airplane in accordance with the disclosure. The airplane 100 of FIG. 1 may include a fuselage 170, wings 172, horizontal stabilizers 174, aircraft engines 176, and a vertical stabilizer 178. Additionally, the airplane 100 may include an ice detection system that may include an ice detector 102, an aircraft angle of attack sensor 104, a wing (or other aircraft control surface) angle of attack sensor 106, a controller 108, and a flight deck 110. Such an ice detection system may be a part of a broader deicing or anti-icing system. The various components of the ice detection system may be linked with digital communications 112. The airplane 100 described in FIG. 1 is exemplary and it is appreciated that in other embodiments, the airplane 100 may include less or additional components (e.g., no horizontal stabilizer or additional stabilizers). Also, the ice detection system may include less or additional components such as additional sensors or may include components that combine the functions of multiple components into one component.

Additionally, concepts described herein may be extended to other aircraft such as helicopters, Unmanned Aerial Vehicles, etc.

The ice detector 102 may detect the formation of ice. In certain embodiments, the ice detector 102 may include a moveable body and an ice detection sensor that may be, for example, a probe such as an accretion detector. The ice detection sensor may be, for example, a capacitive sensor, a resistance sensor, an electric heater sensor, a visual sensor, a vibration sensor, a laser that may detect the presence of ice, and/or any other type of ice detection sensor. The ice detection sensor may be able to detect icing conditions on a portion or all of the housing of the ice detector 102. The ice detector 102 may be located on any portion of the airplane 100. In certain embodiments, the ice detector 102 may be located in a position that would minimize disruption of airflow to the airplane 100's control surfaces. For example, the ice detector 102 may be located at or near the nose of the airplane 100.

The moveable body of the ice detector 102 may be airfoil shaped and may be movable (e.g., may be translated or rotated) to simulate a pressure distribution of a control or flow surface of the airplane 100. The moveable body may be mounted on a swivel base so that an angle of attack of the moveable body may be adjusted. In certain other embodiments, the moveable body may include one or multiple elements and/or components and the positioning (e.g., horizontal, lateral, or vertical positioning) and/or angle of attack of each of the elements and/or components may be adjusted either individually or in concert with other elements and/or components.

In some embodiments, the ice detection sensor may be, for example, disposed within or next to the movable airfoil and the ice detection sensor may detect the formation of ice on the movable airfoil. An ice detector that includes an ice detection sensor and a movable airfoil may be referred to herein as a full envelope ice detector.

In various embodiments described herein, the ice detector 102 may, for example, protrude perpendicular to the fuselage or protrude at a swept angle approximating the swept angle of a wing or other aerodynamic control device of the aircraft. Certain embodiments of the airplane 100 may include a plurality of ice detectors 102, such as two, three, four, or more ice detectors. Different ice detectors on the airplane 100 may be configured to simulate pressure distributions over different aerodynamic devices (e.g., one ice detector may simulate the pressure distribution of the wing or a portion thereof while another ice detector may simulate the pressure distribution of the horizontal stabilizer or a portion thereof) and, accordingly, the different ice detectors may have different airfoil profiles and/or different numbers of elements. The airfoil shaped housing may simulate the pressure distribution of airflow around a portion of the wings 172, the horizontal stabilizers 174, the aircraft engines 176, the vertical stabilizer 178, and/or other wing or surface of the airplane 100.

The airplane 100 may include other sensors. For example, the aircraft angle of attack sensor 104 may be a sensor that may detect an angle of attack of the airplane 100. Additionally, the angle of attack or configuration (e.g., whether the flaps of the wing are retracted or extended or the position of any slats or other wing components) of the wing(s) and/or horizontal stabilizer(s) of the airplane 100 may be determined through various sensors (e.g., wing angle of attack sensor 106). For example, the airplane 100 may include sensors that determine an angle of attack of an aileron of a wing, a configuration of the wings, or other aspects related to the operation of various flow surfaces of the airplane 100 (e.g., a rudder angle of a vertical stabilizer).

The flight deck 110 of the airplane 100 may include controls that may be manipulated by the pilot(s) of the airplane 100 to provide instructions for the operation of the aircraft. For example, the flight deck 110 may include a control or controls for determining the throttle position or wing configuration of the aircraft. The flight deck 110 may also include controls for determining a configuration of the horizontal stabilizer or other aerodynamic device of the airplane 100 as well as the configuration of the vertical stabilizer.

The flight deck 110, the ice detector 102, and the sensors 104 and 106, as well as other components, may be communicatively coupled through one or more digital communication channels 112. The digital communication channel 112 may, for example, be a wired communication circuit or a wireless communications system. The digital communication channel 112 may link the various components to the controller 108.

The controller 108 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 108 and/or its associated operations may be implemented as a single device or multiple devices (e.g., communicatively linked through wired or wireless connections such as the digital communication channel 112) to collectively constitute the controller 108.

The controller 108 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 108 may be adapted to execute instructions stored within the memory to perform various methods and processes described herein, including implementation and execution of control algorithms responsive to sensor and/or operator (e.g., flight crew) inputs.

The controller 108 may be communicatively coupled to the ice detector 102, the ice protection system 114 (which may be a deicing or anti-icing system), the aircraft angle of attack sensor 104, and/or the wing angle of attack sensor 106, as well as possibly other systems. The ice detector 102 may include motors, actuators, or other components to change the angle of attack and/or the orientation or configuration of the ice detector 102. The controller 108 may provide instructions to control the angle of attack and/or orientation or configuration of the ice detector 102 or components thereof.

Figure 2:
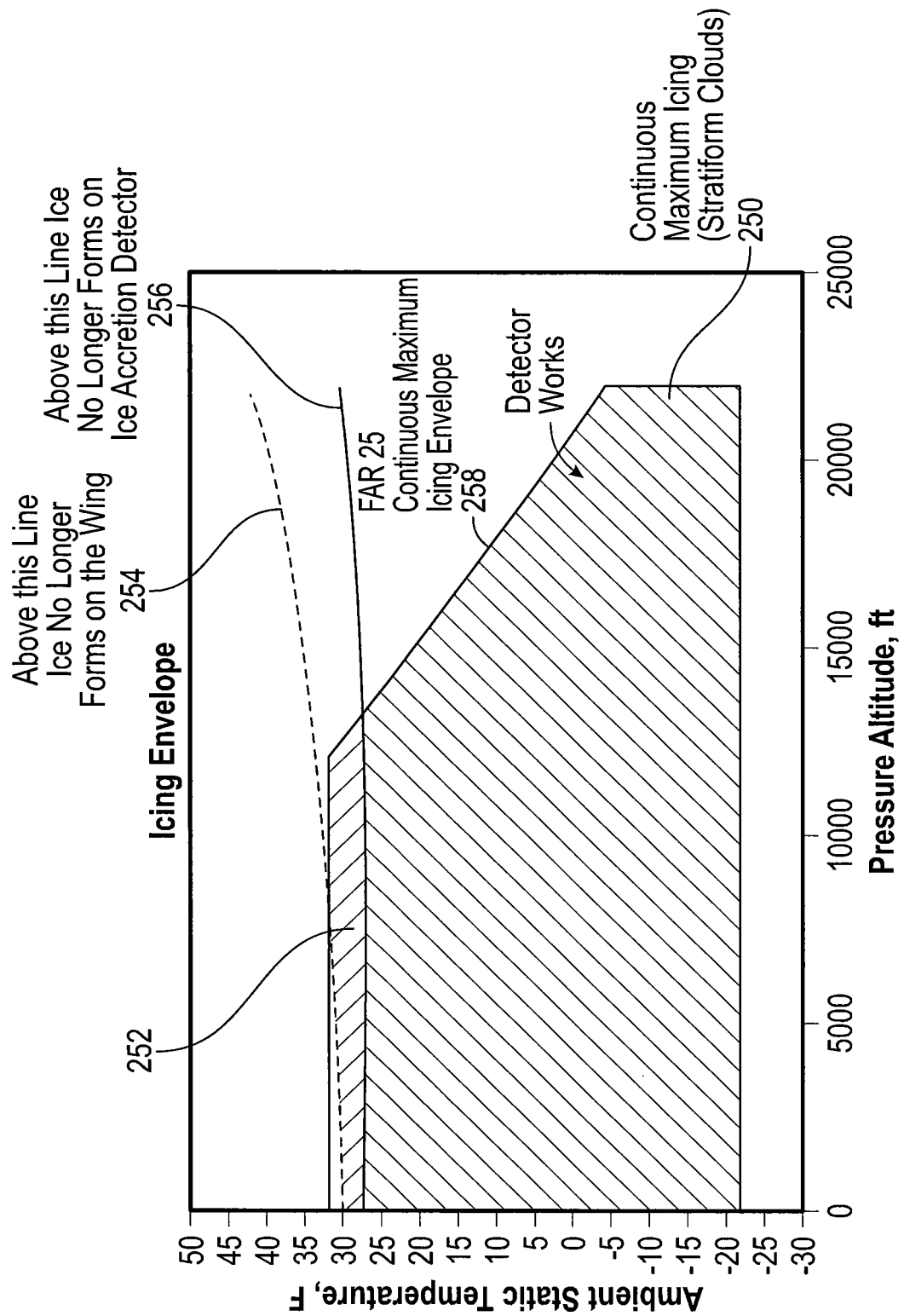
FIG. 2 is a graph illustrating detection envelopes of conventional ice detection systems.

In certain embodiments, conventional ice detection systems may be unable to detect ice formation under certain conditions. FIG. 2 is a graph illustrating detection envelopes of conventional ice detection systems. The graph of FIG. 2 illustrates a zone of non-detection ("ZND") of a conventional ice detection system.

In FIG. 2, the x-axis denotes pressure altitude (e.g., the air pressure typically experienced at the altitude) while the y-axis denotes ambient temperature. A temperature-pressure curve signifying the formation of ice is shown in FIG. 2. Shaded area 258 shows an example continuous maximum icing envelope defined by the Federal Aviation Administration. Line 254 shows a line along the temperature-pressure curve where ice would no longer form on a typical wing. The wing is airfoil shaped and, thus, the air flow over the top of the wing is lower pressure than ambient. Due to the lower pressure region created by the airfoil shape of the wing, ice may form on top of the wing or in other portions of the wing that experiences lower than ambient pressure. Such a phenomenon may be exaggerated when wings or other aerodynamic devices are in certain higher lift configurations (e.g., configurations used for take-off or landing). However, as conventional ice detectors may not have an airfoil shape and/or may not be adjustable in angle of attack or configuration to mimic different configurations of the wing or other aerodynamic devices, the temperature-pressure curve where ice would no longer form on a typical ice detector is shown by line 256. As shown, line 256 is below line 254.

Region 250 shows where ice formation on the aerodynamic device may be detected by the ice detector. As typical ice detectors may only accrete ice at temperatures lower than that of the typical wing or other aerodynamic device, due to the aerodynamic device's lift generating shape, region 252 shows the ZND where ice may form on an aerodynamic device, but not on an ice detector, and thus the ice detector may not detect the formation of ice on the aerodynamic device.

Figure 3:
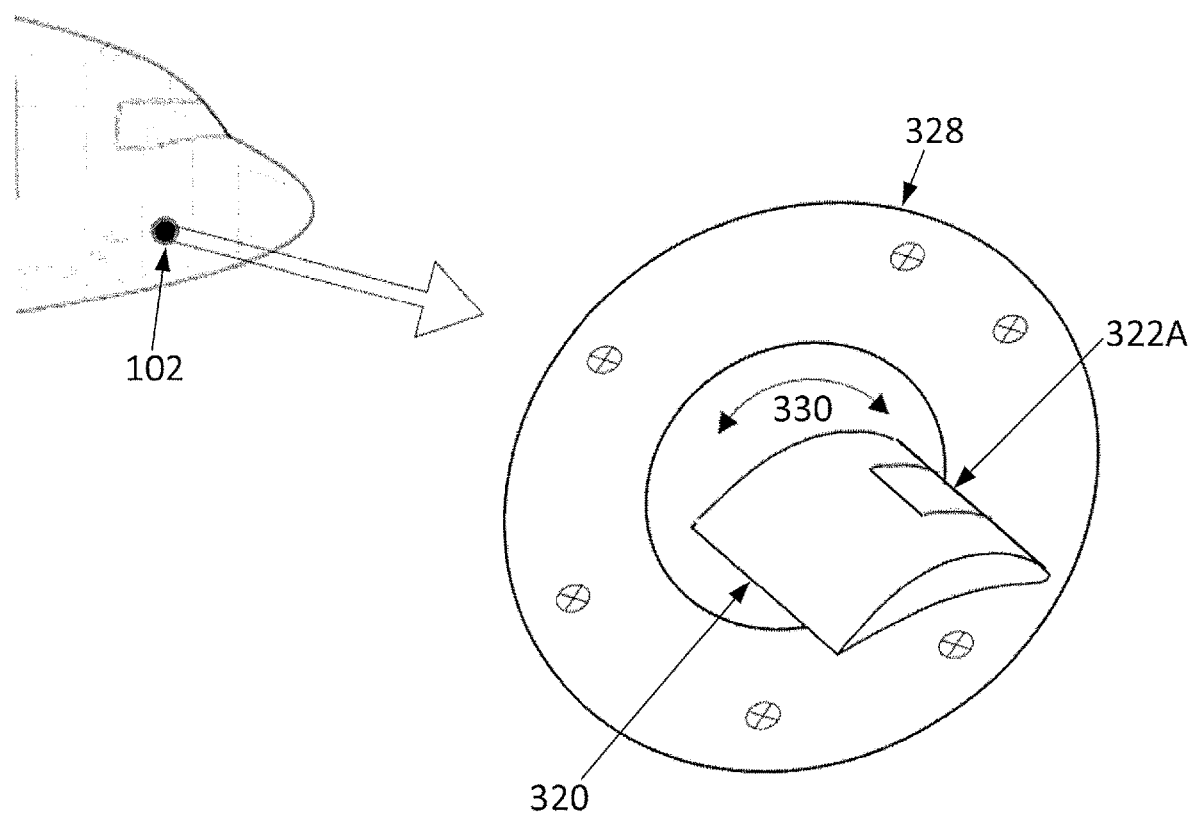
FIG. 3 illustrates an example of an ice detector in accordance with the disclosure.

Described herein are systems and techniques for eliminating the ZND. FIG. 3 illustrates an example of an ice detector in accordance with the disclosure. The ice detector 102 of FIG. 3 may include a movable airfoil 320, an ice detection sensor 322A, and a fuselage attachment 328. FIG. 3 may illustrate elements of the ice detector 102 that are exposed to airflow.

The ice detector 102 may include one or more ice detection sensors. The ice detection sensor(s) may be any ice detection sensor described herein, such as a capacitive sensor, a resistance sensor, a resistive heater, a visual sensor, a vibration sensor, a laser that may detect the accretion or presence of ice, and/or any other type of ice detection sensor. The ice detection sensor(s) may be configured to detect accretion of ice on the movable airfoil 320. The ice detection sensor 322A in FIG. 3 is located on the movable airfoil 320 and may be any type of sensor that detects accretion of ice on a surface of the movable airfoil 320. In other embodiments, the ice detection sensor(s) may be located within the movable airfoil, located proximate the movable airfoil such as in front of or off to the side of the movable airfoil, or located in an area that would allow the ice detection sensor(s) to detect accretion of ice on the movable airfoil. Certain such embodiments may include a movable ice detection sensor that may be configured to move between multiple locations and/or may translate and/or rotate between various positions (e.g., may rotate to detect various different portions of the movable airfoil 320). In some cases, such as that of a vibration sensor, the airfoil may be the sensor itself, and the entire sensor may be configured to vibrate at a controlled frequency. The movable airfoil 320 may be generally airfoil shaped. The movable airfoil 320 may be shaped to approximate the pressure distribution over a surface or surfaces of one or more aerodynamic devices of the airplane. For example, in certain embodiments, the movable airfoil 320 may simulate or approximate the pressure distribution across the entire aerodynamic device (e.g., wing, horizontal stabilizer, engine inlet, or other control surface of the airplane) or the movable airfoil 320 may simulate a portion of the aerodynamic device (e.g., a section of the wing, horizontal/vertical stabilizer, engine inlet, or other control surface of the airplane) or even a single point of the aerodynamic device. In certain embodiments the movable airfoil 320 may be shaped to simulate the lowest pressure portion or point of the aerodynamic device. In certain situations, the lowest pressure point of the aerodynamic device may be the portion or point of the aerodynamic device most likely to accrete ice or may be the portion or point that ice will form over first.

The movable airfoil 320 may include one or multiple movable elements (e.g., multiple airfoil shaped elements). In such embodiments, each element may simulate a portion of the aerodynamic device (e.g., a first element of the movable airfoil 320 may simulate a main part of the wing while a second element of the movable airfoil 320 may simulate a flap, slat, or aileron of the wing). One or more of the multiple elements may translate or rotate, either independently or responsive to movement of the other elements. For example, the movable airfoil 320 may be configured to rotate through the rotation path 330 to better approximate the pressure distribution over a control and/or flow surface of the airplane. By rotating the movable airfoil 320, the angle of attack of the movable airfoil 320 relative to airflow may be adjusted. Adjusting the angle of attack of the movable airfoil 320 may allow the movable airfoil 320 to better approximate the pressures imparted by airflow over the surface(s) of the aerodynamic devices simulated. Thus if, for example, the movable airfoil 320 is configured to simulate the pressures experienced by a portion of the wing, and the flaps of the wing are deployed, the movable airfoil 320 may be rotated to vary the angle of attack of the movable airfoil 320 to better approximate the pressures experienced by the wing with flaps deployed. In other embodiments, the configuration of the movable airfoil 320 may be changed in lieu of or in addition to changing the angle of attack of the movable airfoil 320. Such embodiments may be further described in FIGS. 5A, 5B, and 5C.

In certain embodiments, the movable airfoil 320 may approximate the pressure distribution of the aerodynamic device that it is simulating by being shaped substantially similar to the aerodynamic device that is simulating. Accordingly, various embodiments of the movable airfoil 320 may be shaped to match the shape of the aerodynamic devices of the airplane it is simulating (e.g., a Boeing 737 may include, for example, three movable airfoils that may simulate the pressure distributions of the wing, the horizontal stabilizer, and the surface of the engine nacelle while a Boeing 777 may include, for example, three movable airfoils that are shaped differently from the movable airfoils of the Boeing 737 movable bodies to simulate the wing, horizontal stabilizer, and the surface of the engine nacelle of the Boeing 737). In such embodiments, the movable airfoil 320 may thus be similar to a miniature model of the aerodynamic device or portion of the aerodynamic device being simulated. In other embodiments, the movable airfoil 320 may not be shaped substantially similar to the aerodynamic device that it is simulating. In such embodiments, the movable airfoil 320 may be shaped to approximate the pressures experienced by the aerodynamic device, but not approximate the shape of the aerodynamic device. Accordingly, while the shape of the movable airfoil 320 may vary from the aerodynamic device or portion of the aerodynamic device being simulated, a combination of the shape of the movable airfoil 320, the configuration, and the angle of attack may allow the movable airfoil 320 to simulate the pressures experienced by the aerodynamic device. In certain embodiments, the movable airfoil 320 may be configured to simulate a portion or only the lowest pressure portion of the aerodynamic device.

Additionally, the movable airfoil 320 and/or other components of the ice detection system may include deicing elements. Such deicing elements may be used melt any ice that may form on the movable airfoil and/or other components and allow the ice detection system to re-confirm or determine if conditions have changed (e.g., if previous conditions would have formed ice on the aerodynamic devices, but current conditions would not).

The fuselage attachment 328 may attach the ice detector 102 to the aircraft. The fuselage attachment 328 may be a plate that can be attached flush to the fuselage of the aircraft to minimize drag. One or more screws, rivets, welds, or other attachment techniques may be used to attach portions of the fuselage attachment 328 to the fuselage. In certain embodiments, the ice detector may be attached to other portions of the aircraft (e.g., the wing, horizontal/vertical stabilizer, aircraft engine, or other areas) and thus in those embodiments the fuselage attachment 328 may be an attachment that is curved or otherwise and is configured to attach to the other portions of the aircraft.

Figure 4:
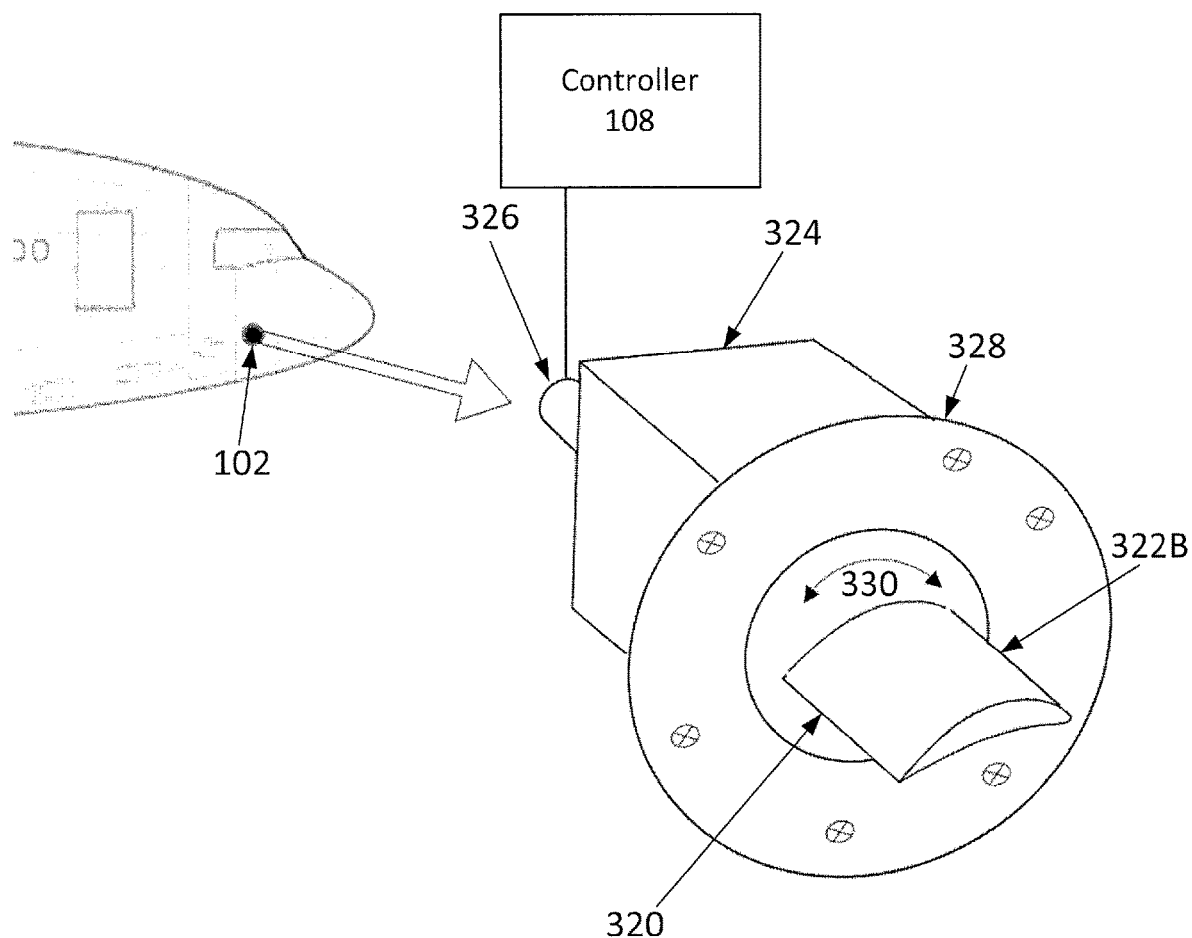
FIG. 4 illustrates a further example of an ice detector in accordance with the disclosure.

FIG. 4 illustrates a further example of an ice detector in accordance with the disclosure. The ice detector 102 of FIG. 4 may include the movable airfoil 320, the fuselage attachment 328, an ice detection sensor 322B, a motor 324, a connector 326, and the controller 108. The movable airfoil 320 and the fuselage attachment 328 may be similar to the respective components described in FIG. 3.

The ice detection sensor 322B may be another embodiment of the ice detection sensor 322A. The ice detection sensor 322B may be coupled to or embedded on the surface of the movable airfoil 320 and/or located on the movable airfoil 320 in another manner. The ice detection sensor 322B may be, for example, a capacitive sensor (that may, for example, determine the accretion of ice by detecting a difference in capacitance of the surface of the movable airfoil 320 due to ice accretion), a resistance sensor (that may, for example, determine the accretion of ice by detecting a difference in resistance of the surface), an electric heater sensor, a visual sensor (that may, for example, detect a difference in an opacity of a window on the movable airfoil 320), a vibration sensor (that may, for example, detect a difference in the frequency of vibration of the movable airfoil 320), a laser that may detect the accretion of ice, and/or any other type of ice detection sensor that may detect accretion of ice on the movable airfoil 320. Other embodiments of the ice detection sensor may locate the ice detection sensor in other areas as well as include other types of sensors. The ice detection sensor may be any sensor and/or may be located in any location that will allow the detection of ice accretion on the movable airfoil 320.

The motor 324 may move the movable airfoil 320. The motor 324 may be one or more electric, hydraulic, mechanical, or other type of motor that may rotate and/or translate the movable airfoil 320 or portions therein. In certain embodiments, the motor 324 may change the angle of attack or configuration of the movable airfoil 320. The motor may be directed attached to the movable airfoil 320 or may be coupled to the movable airfoil 320 via mechanisms such as gears, push and pull rods, springs, linkages, and/or other mechanisms.

The connector 326 may be an electrical connection to the motor 324, the movable airfoil 320, and/or an ice detection sensor. The connector 326 may be a power connection (e.g., a connection providing electrical power) and/or a data connection to the components of the ice detector 102. The connector 326 may be a part of the digital communication channel 112 and may provide instructions to the ice detector 102 from the controller 108 as well as communicate data from, for example, the ice detector 102.

Figure 5A:
FIG. 5A illustrates an embodiment of a movable airfoil of a full envelope ice detector in accordance with the disclosure.

FIG. 5A illustrates an embodiment of a movable airfoil of a full envelope ice detector in accordance with the disclosure. The movable airfoil shown in FIG. 5A includes a first element 320A. The first element 320A may include one or many ice detection sensors.

The first element 320A may be configured to simulate pressures experienced by a first section of the aerodynamic device (e.g., a main section of the wing). The first element 320A may be configured to rotate and/or translate, responsive to changes to the angle of attack and/or configuration (e.g., flaps up or down, faster or slower throttle position of an aircraft engine, or other configuration) of the first section of the aerodynamic device or the aerodynamic device in general. For example, the first element 320A may be moved responsive to a change in configuration of the aerodynamic device. For example, deploying of flaps in an airplane may be simulated by the first element 320A as a change in the angle of attack in embodiments where the movable airfoil 320 may be configured to simulate a pressure distribution, but not a configuration of the wing of the airplane. In certain other examples, the first element 320A may rotate, translate, or otherwise move while the first element of the wing may not have moved (such conditions may include, for example, if the airspeed, temperature, or pressure has changed). In such an example, the first element 320A may be rotated or moved responsive to the changes in condition if the controller determines that rotating or otherwise moving the first element 320A may most accurately simulate the pressure distribution over the aerodynamic device of the new conditions.

Figure 5B:
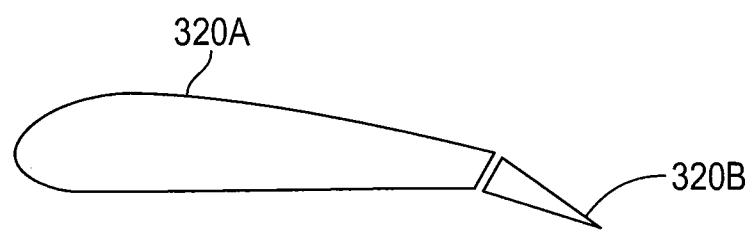
FIG. 5B illustrates another embodiment of a movable airfoil of a full envelope ice detector in accordance with the disclosure.

FIG. 5B illustrates another embodiment of a movable airfoil of a full envelope ice detector in accordance with the disclosure. The movable airfoil of FIG. 5B may include the first element 320A as well as a second element 320B. The second element 320B may be configured to simulate pressures experienced by a second section of the aerodynamic device (e.g., a flap, slat, aileron, or other portion of the wing). In certain embodiments, the second element 320B may be configured to simulate pressures experienced by an element of a wing located on a rearward portion of the wing. The second element 320B may be configured to move responsive to changes to the angle of attack and/or configuration of the second section of the aerodynamic device or the aerodynamic device in general. Additionally, the first element 320A and the second element 320B may move independently of each other. In certain embodiments, element 320B may not correspond to a flap on the reference airplane surface. Instead, element 320B may, for example, be used independently and be adjusted so that the movable airfoil as a whole can match the pressure distribution of the reference airfoil surface.

Figure 5C:
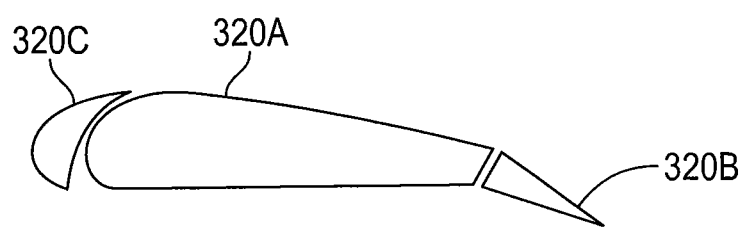
FIG. 5C illustrates a further embodiment of a movable airfoil of a full envelope ice detector in accordance with the disclosure.

FIG. 5C illustrates a further embodiment of a movable airfoil of a full envelope ice detector in accordance with the disclosure. In certain embodiments, the movable airfoil may include more than two elements, such as three elements, four element, or five or more elements. The movable airfoil shown in FIG. 5C may include the first element 320A, the second element 320B, and a third element 320C. Such multi-element movable bodies may be used to more accurately simulate the pressure distribution over the aerodynamic device or portion of the aerodynamic device. The third element 320C may be configured to simulate pressures experienced by a third section of the aerodynamic device (e.g., a flap, slat, aileron, or other portion of the wing) and/or used to vary the aerodynamics of the movable airfoil so that the first element 320A and/or second element 320B may more accurately simulate pressures of the corresponding aerodynamic device.

Figure 6:
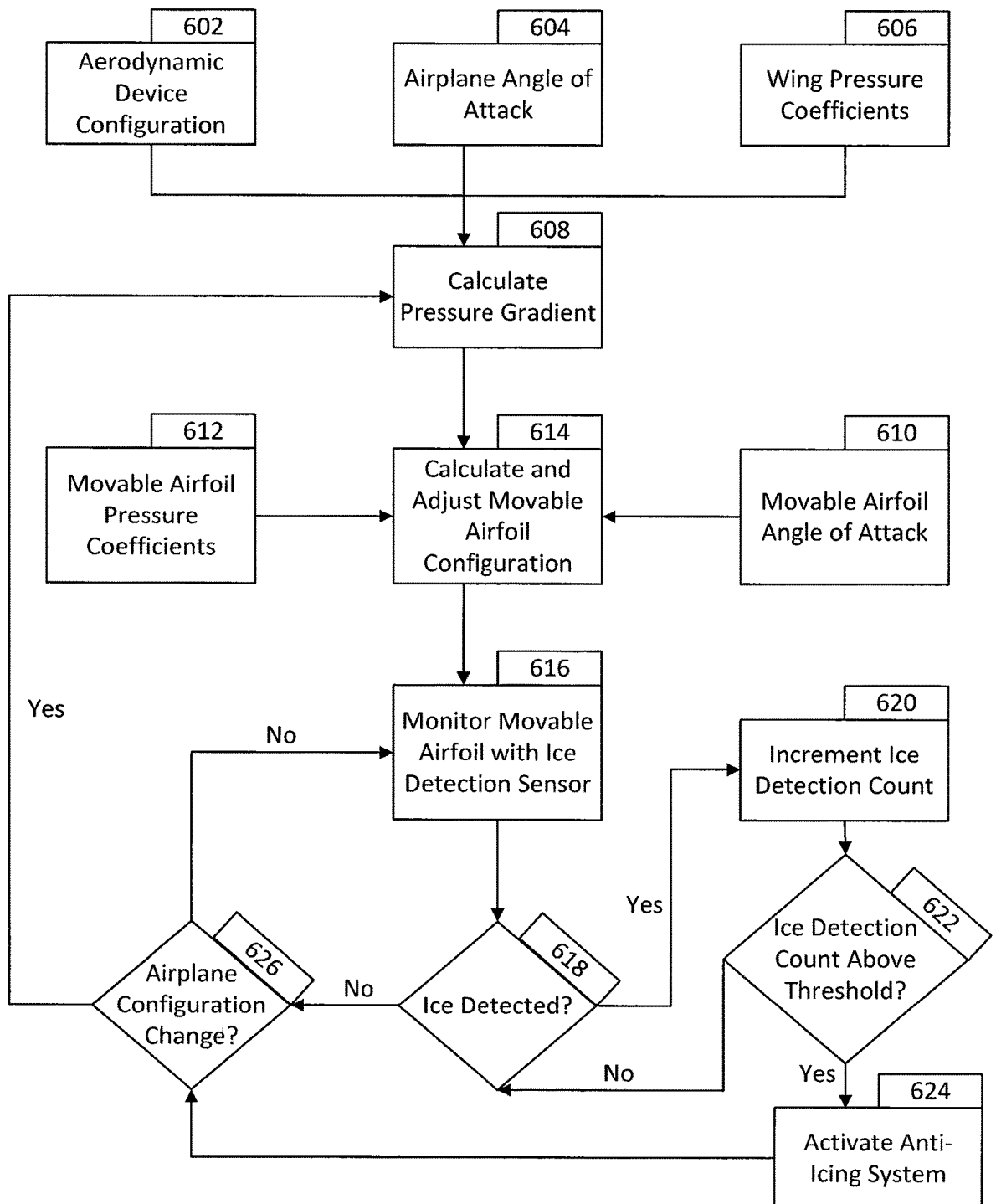
FIG. 6 illustrates a flowchart detailing an ice detection and prevention process in accordance with the disclosure.

FIG. 6 illustrates a flowchart detailing an ice detection and prevention process in accordance with the disclosure. The process described in FIG. 6 may be performed with any of the systems described herein.

In blocks 602, 604, and 606, the configuration of the aerodynamic device (including the angle of attack), the airplane angle of attack, and the wing pressure coefficients may be determined. The wing configuration may be determined through one or more of the wing angle of attack sensor, other sensors mounted on the wing (such as sensors detecting when a flap is deployed), and/or through the controller (e.g., when the controller detects pilot input for setting the ailerons or flaps in a certain configuration). The airplane angle of attack may be determined by the airplane angle of attack sensor or through other accelerometers, gyros, or other systems of the aircraft. The wing pressure coefficient may be predetermined by, for example, testing within a wind tunnel. The pressure coefficients may be correlated to air speed, temperature, altitude, and/or pressure.

In block 608, the aerodynamic device configuration, airplane angle of attack, and the wing pressure coefficients may be used to calculate an aerodynamic device pressure gradient and/or pressure at a point of the aerodynamic device. The calculations may then be used, in block 614, along with the movable airfoil pressure coefficients (which may be determined in a similar manner as that of the wing pressure coefficients, e.g., within a wind tunnel) in block 612 and a determined movable airfoil angle of attack and/or configuration in block 610 to determine a configuration of the movable airfoil that may best simulate the pressure gradient and/or pressure at the point. The configuration of the movable airfoil calculated may include an angle of attack and other configuration factors (e.g., whether to translate or rotate the elements of the movable airfoil). Once the configuration has been calculated and determined, the movable airfoil may then be positioned according to the calculated configuration (e.g., moved into the calculated position).

In certain embodiments, a single movable airfoil may be configured to simulate a plurality of portions of an aerodynamic device or a plurality of aerodynamic devices of the airplane. Thus, the single movable airfoil may, for example, be configured to simulate the pressure distribution of a first and a second portion of a wing of the airplane and/or be configured to simulate the pressure distribution of a wing and a horizontal stabilizer of the airplane. In such embodiments, the single movable airfoil may cycle through multiple configurations to simulate the multiple pressure distributions. Such an embodiment may be in a single configuration for a period of time determined to be sufficient to accurately detect accretion of ice before cycling to another configuration.

The movable airfoil may then be monitored in block 616 with the ice detection sensor for any ice build-up. In certain embodiments, ice build-up may need to be detected a plurality of times in block 618 before the controller determines that there is ice build-up on the corresponding aerodynamic device being simulated. That is, ice build-up may be detected a first time on the movable airfoil, the movable airfoil may then be deiced, and then ice build-up may be determined a second time within a set timeframe before the controller determines that there is ice build-up on the aerodynamic device. Accordingly, if ice build-up is detected in block 618, an ice detection count may be incremented in block 620. The ice detection count may be a continuously running count though, in certain embodiments, the ice detection count may be reset after a certain timeframe or may only include instances of ice detection within the certain timeframe. The ice detection count may then be compared to a threshold in block 622 and, if the ice detection count exceeds the threshold, an anti-icing and/or deicing system of the aircraft may be activated and/or indication of the presence of ice may be provided to the pilot and/or the crew in block 624. The anti-icing and/or deicing system may be, for example, heating elements located with the wing, stabilizers, fuselage, aircraft engine, and/or other parts of the aircraft that may provide heat to melt any ice that has formed.

If no ice build-up is detected in block 618, the process may proceed to block 626 and determine whether there are any changes in the airplane configuration may be determined. A change in airplane configuration may include, for example, a change in the configuration (e.g., angle of attack or shape) of the aerodynamic devices of the airplane, or a change in altitude, ambient pressure, ambient temperature, air speed, or other factor(s) that may contribute to ice build-up. If such a change is not detected, the airplane may continue monitoring for ice build-up in block 616. If a change is detected, then the wing pressure gradient may be recalculated, according to the new conditions, in block 608 and the configuration of the movable airfoil may then be accordingly adjusted. In certain embodiments, if a change in configuration is detected, the ice detection count may also be reset and/or the threshold for the ice detection count may be changed.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus for an aircraft, comprising:
an ice detector comprising a movable airfoil configured to be disposed on the aircraft and an ice detection sensor configured to detect ice on the movable airfoil, wherein:
an angle of attack of the movable airfoil is configured to be adjustable during operation of the aircraft, and
the movable airfoil is configured to substantially simulate a pressure distribution around a portion of the aircraft during the operation of the aircraft; and
a controller communicatively coupled to at least the ice detector and electrical circuitry of the aircraft, the controller configured to:
determine a current configuration of the aircraft, wherein the current configuration comprises an angle of attack of the aircraft and an operating position of the portion of the aircraft,
provide instructions to adjust, responsive to the determining the current configuration of the aircraft, the angle of attack of the movable airfoil to approximate the pressure distribution around the portion of the aircraft in the current configuration of the aircraft,
receive data from the ice detection sensor, and
determine ice accretion on the movable airfoil via the data from the ice detection sensor.

2. The apparatus of claim 1, wherein the ice detection sensor comprises one or more of a capacitive sensor, a resistance sensor, a resistive heater, a visual sensor, a vibration sensor, and/or a laser sensor, wherein the movable airfoil comprises a window, and wherein the ice detection sensor is disposed within the movable airfoil and configured to detect ice through the window.

3. The apparatus of claim 1, wherein the ice detector further comprises a deicing element disposed within the movable airfoil.

4. The apparatus of claim 3, wherein the data from the ice detection sensor is first data received over a first time period, and wherein the controller is further configured to:
increment an ice detection count in response to the determining the ice accretion via the first data;
compare the ice detection count to a detection threshold;
determine that the ice detection count does not meet the detection threshold;
operate the deicing element to device the movable airfoil;
receive second data from the ice detection sensor over a second time period;
determine ice accretion on the movable airfoil via the second data from the ice detection sensor;
increment the ice detection count in response to determining the ice accretion via the second data;
compare the incremented ice detection count to a detection threshold;
determine that the incremented ice detection count meets or exceeds the detection threshold; and
determine ice accretion on the portion of the aircraft.

5. The apparatus of claim 1, wherein the movable airfoil is configured to generate a movable airfoil pressure distribution that substantially matches a surface pressure distribution around the portion of the aircraft by, at least, a shape of the movable airfoil and the adjusting of the angle of attack of the movable airfoil, and wherein the portion of the aircraft is a flow surface configured to affect an aerodynamic characteristic of the aircraft and comprises at least one of a wing, engine inlet, and empennage.

6. The apparatus of claim 1, wherein the movable airfoil comprises a first element and a second element movable relative to the first element, wherein the movable airfoil is configured to substantially simulate airflow around at least a first surface and a second surface of a wing or empennage of the aircraft during operation of the aircraft, and wherein the controller is configured to:
determine a first current configuration of the first surface, wherein the first current configuration comprises a current angle of attack of the aircraft and an operating position of movable portions of the first surface at a first time;
provide instructions to adjust, responsive to the determining the first current configuration, the angle of attack of the second element to a first angle to simulate the first surface for a first time period;
determine a second current configuration of the second surface, wherein the second current configuration comprises a current angle of attack of the aircraft and an operating position of movable portions of the second surface at a second time; and
provide instructions to adjust, responsive to the determining the second current configuration, the angle of attack of the second element to a second angle to simulate the second surface for a second time period.

7. The apparatus of claim 6, wherein the second movable element is a flap.

8. The apparatus of claim 6, wherein the movable airfoil further comprises a third movable element.

9. The apparatus of claim 8, wherein the third movable element is a slat.

10. The apparatus of claim 1, wherein the portion of the aircraft simulated is at least one of a lowest pressure and a lowest temperature portion of the aircraft.

11. The apparatus of claim 1, wherein the movable airfoil is configured to be adjustable during flight of the aircraft.

12. An aircraft comprising the apparatus of claim 1, wherein the movable airfoil is disposed on an outer surface of the aircraft, and the aircraft further comprises:
a fuselage;
a wing;
an engine; and
an empennage, wherein the portion of the aircraft is a portion of at least one of the wing, the engine, and the empennage.

13. The aircraft of claim 12, further comprising an angle of attack sensor configured to detect the angle of attack of the aircraft, wherein the determining the current configuration is based on data from the angle of attack sensor.

14. The aircraft of claim 12, wherein the movable airfoil is a first movable airfoil, the surface is a first surface, and further comprising a second movable airfoil, wherein the second movable airfoil is configured to substantially simulate at least a second surface of the aircraft by, at least in part, a shape of the second movable airfoil and adjusting an angle of attack of at least a portion of the second movable airfoil.

15. The aircraft of claim 12, further comprising a deicing or anti-icing system disposed within at least the portion of the wing, engine, or empennage, and wherein the controller is further configured to operate the deicing or anti-icing system responsive to determining ice accretion on the movable airfoil.

16. A method comprising:
determining a current configuration of an aircraft, wherein the current configuration comprises an angle of attack of the aircraft and an operating position of movable portions of a wing or an empennage of the aircraft;
adjusting, responsive to determining the current configuration of the aircraft, an angle of attack of a movable airfoil of an ice detector of the aircraft, wherein the movable airfoil is configured to substantially simulate a pressure distribution around at least a portion of the wing or the empennage of the aircraft during operation of the aircraft, the movable airfoil adjusted to approximate the pressure distribution around the portion of the wing or the empennage during operation of the aircraft; and
determining ice accretion on the movable airfoil.

17. The method of claim 16, wherein the determined ice accretion is a first instance of ice accretion, and wherein the method further comprises:
incrementing an ice detection count in response to the determining the first instance of the ice accretion;
comparing the ice detection count to a detection threshold;
determining that the ice detection count does not meet the detection threshold;
operating a deicing element of the ice detector to device the movable airfoil;
determining a second instance of ice accretion on the movable airfoil;
incrementing the ice detection count in response to determining the second instance of the ice accretion;
comparing the incremented ice detection count to a detection threshold;
determining that the incremented ice detection count meets or exceeds the detection threshold; and determining ice accretion on the wing or empennage of the aircraft.

18. The method of claim 16, further comprising:
translating, responsive to the determining the current configuration of the aircraft, the movable airfoil.

19. The method of claim 16, further comprising:
adjusting at least the portion of the movable airfoil to be in a first angle of attack to approximate the pressure distribution over at least a first surface of the aircraft during the operation of the aircraft; and
adjusting at least the portion of the movable airfoil to be in a second angle of attack to approximate the pressure distribution over at least a second surface of the aircraft during the operation of the aircraft.

20. The method of claim 17, further comprising:
operating a deicing system disposed within the wing or empennage responsive to determining ice accretion on the on the wing or empennage.

* * * * *

UNITED STATES PATENT AND TRADEMARK OFFICE
CERTIFICATE OF CORRECTION

PATENT NO. : 10,737,793 B2  
APPLICATION NO. : 14/957478  
DATED : August 11, 2020  
INVENTOR(S) : Charles Steven Meis and Anthony D. Drury Page 1 of 1

It is certified that error appears in the above-identified patent and that said Letters Patent is hereby corrected as shown below:

In the Claims

Column 11, Line 14 should read:  
operate the deicing element to deice the movable airfoil;

Column 12, Line 58 should read:  
operating a deicing element of the ice detector to deice Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*